US008683065B2

(12) United States Patent
Dickens et al.

(10) Patent No.: US 8,683,065 B2
(45) Date of Patent: Mar. 25, 2014

(54) MULTICAST CONTENT PROVIDER (75) Inventors: Christopher Scott Dickens, Issaquah, WA (US); Asad Yaqoob, Redmond, WA (US); Saad Syed, Kirkland, WA (US); Blaine Young, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1144 days.

(21) Appl. No.: 11/824,280

(22) Filed: Jun. 29, 2007

(65) Prior Publication Data

US 2009/0006642 A1    Jan. 1, 2009

(51) Int. Cl.
G06F 15/16    (2006.01)

(52) U.S. Cl.
USPC .......................... 709/231; 709/230; 709/219

(58) Field of Classification Search
USPC .......... 709/204, 231, 232, 230, 219; 370/390, 370/432, 338; 375/260; 455/432.1; 713/163; 705/51
See application file for complete search history.

(56) References Cited

U.S. PATENT DOCUMENTS

| | | |
|---|---|---|
| 5,805,825 A | 9/1998 | Danneels et al. |
| 5,905,871 A | 5/1999 | Buskens et al. |
| 6,049,878 A | 4/2000 | Caronni et al. |
| 6,101,184 A | 8/2000 | Tobe et al. |
| 6,104,709 A | 8/2000 | Rinchiuso et al. |
| 6,144,651 A | 11/2000 | Rinchiuso et al. |
| 6,151,696 A | 11/2000 | Miller et al. |
| 6,154,463 A | 11/2000 | Aggarwal et al. |
| 6,256,673 B1 | 7/2001 | Gayman |
| 6,269,080 B1 | 7/2001 | Kumar |
| 6,269,085 B1 | 7/2001 | Provino et al. |
| 6,385,647 B1 | 5/2002 | Willis et al. |
| 6,427,166 B1 | 7/2002 | Hurst et al. |
| 6,453,438 B1 | 9/2002 | Miller et al. |
| 6,526,022 B1 | 2/2003 | Chiu et al. |
| 6,577,599 B1 | 6/2003 | Gupta et al. |
| 6,594,798 B1 | 7/2003 | Chou et al. |
| 6,693,907 B1 | 2/2004 | Wesley et al. |
| 6,718,361 B1 | 4/2004 | Basani et al. |
| 6,807,578 B2 | 10/2004 | Satran et al. |
| 6,813,714 B1 | 11/2004 | Hardjono et al. |
| 6,904,464 B1 | 6/2005 | Van Langen et al. |
| 6,931,005 B1 | 8/2005 | Wilhelm |
| 6,973,081 B1 | 12/2005 | Patel et al. |
| 7,031,326 B1 | 4/2006 | Shur et al. |

(Continued)

OTHER PUBLICATIONS

Barcellos et al, "An End-to-End Reliable Multicast Protocol Using Polling for Scaleability", IEEE, 1998, pp. 1180-1187.*

(Continued)

*Primary Examiner* — Jungwon Chang
(74) *Attorney, Agent, or Firm* — Andrew Sanders; Micky Minhas (57) ABSTRACT

A multicast content provider operates on a multicast server in conjunction with a multicast transmission protocol that is independent of the content data transmitted and allows extensibility in the content provider to distribute any type of content. The content provider module is designed to find, read, write, and transform particular types of data into a form acceptable for transmission by the transmission protocol on the multicast server. The transmission protocol is agnostic to the type, size, format, or location of the data file. The content provider module manages these issues so that the transmission protocol does not have to. This relationship between the content provider module and the transmission protocol establishes a "generic" multicast solution, capable of complete flexibility with regard to content delivery.

20 Claims, 5 Drawing Sheets (56) References Cited

U.S. PATENT DOCUMENTS

| | | | |
|---|---|---|---|
| 7,035,214 | B1 | 4/2006 | Seddigh et al. |
| 7,035,217 | B1 | 4/2006 | Vicisano et al. |
| 7,035,657 | B2 | 4/2006 | Chen et al. |
| 7,107,606 | B2 | 9/2006 | Lee |
| 7,133,371 | B2 | 11/2006 | Helm et al. |
| 7,143,179 | B2 | 11/2006 | Yaport et al. |
| 7,177,917 | B2 | 2/2007 | Giotta |
| 7,184,421 | B1 | 2/2007 | Liu et al. |
| 7,191,332 | B1* | 3/2007 | Pankajakshan et al. ...... 713/163 |
| 7,206,811 | B2 | 4/2007 | Skurikhin et al. |
| 7,227,843 | B2 | 6/2007 | Belanger et al. |
| 7,355,975 | B2 | 4/2008 | Liu et al. |
| 7,400,601 | B2 | 7/2008 | Moritani et al. |
| 7,882,240 | B2 | 2/2011 | Dickens et al. |
| 8,018,933 | B2 | 9/2011 | Dickens et al. |
| 2002/0024956 | A1 | 2/2002 | Keller-Tuberg |
| 2002/0035730 | A1 | 3/2002 | Ollikainen et al. |
| 2002/0129159 | A1 | 9/2002 | Luby et al. |
| 2002/0165920 | A1* | 11/2002 | Keller-Tuberg ............... 709/204 |
| 2003/0126514 | A1 | 7/2003 | Shabbir Alam et al. |
| 2003/0147390 | A1 | 8/2003 | Rizzo et al. |
| 2003/0206549 | A1 | 11/2003 | Mody et al. |
| 2004/0132448 | A1 | 7/2004 | Torres et al. |
| 2004/0213177 | A1 | 10/2004 | Moritani et al. |
| 2004/0267960 | A1 | 12/2004 | Riedle |
| 2005/0089035 | A1* | 4/2005 | Klemets et al. ............... 370/390 |
| 2005/0160345 | A1 | 7/2005 | Walsh et al. |
| 2005/0216472 | A1 | 9/2005 | Leon et al. |
| 2006/0030312 | A1* | 2/2006 | Han et al. .................... 455/432.1 |
| 2006/0050672 | A1* | 3/2006 | Shim et al. .................... 370/338 |
| 2006/0159090 | A1 | 7/2006 | Chang et al. |
| 2006/0233271 | A1* | 10/2006 | Savas et al. .................... 375/260 |
| 2006/0239275 | A1 | 10/2006 | Zlateff et al. |
| 2006/0248090 | A1 | 11/2006 | Bennett et al. |
| 2007/0002858 | A1 | 1/2007 | Bichot et al. |
| 2007/0005804 | A1 | 1/2007 | Rideout |
| 2007/0058626 | A1 | 3/2007 | Keller et al. |
| 2007/0083667 | A1* | 4/2007 | Cooper ......................... 709/231 |
| 2007/0091889 | A1 | 4/2007 | Xiao et al. |
| 2007/0118866 | A1 | 5/2007 | Chen |
| 2007/0147411 | A1* | 6/2007 | Bijwaard et al. ............. 370/432 |
| 2007/0265968 | A1* | 11/2007 | Kahn et al. ....................... 705/51 |
| 2008/0181159 | A1 | 7/2008 | Metzler et al. |
| 2008/0183808 | A1 | 7/2008 | Salesky et al. |
| 2009/0003342 | A1* | 1/2009 | Dickens et al. ............... 370/390 |
| 2009/0006641 | A1* | 1/2009 | Yaqoob et al. ............... 709/231 |
| 2011/0286379 | A1 | 11/2011 | Dickens et al. |

OTHER PUBLICATIONS

Subramaniam, et al., "Building a Reliable Multicast Service Based on Composite Protocols", Technical Report, ITTC-F2004-TR-19740-11, Date: Jul. 2003, pp. 1-116, The University of Kansas Center for Research, Inc., 2335 Irving Hill Road, Lawrence, KS 66045-7612.
Armstrong, S. et al., "RFC1301—Multicast Transport Protocol", Network Working Group Request for Comments: 1301, Feb. 1992; www.faqs.org/rfcs/rfc1301.html, 29 pgs.
Barcellos, et al., "Efficient TCP-like Multicast Support for Group Communication Systems", Proceedings of the IX Brazilian Symposium on Fault-Tolerant Computing, Mar. 2001, 15 pgs.
Barcellos, Marinho et al., "An End-to-End Reliable Multicast Protocol Using Polling for Scaleability", 1998 IEEE, pp. 1180-1187.
Chiu, et al., "Pruning Algorithms for Multicast Flow Control", Sun Microsystems Laboratories, Burlington, MA, Jun. 2000, 10 pgs.
Chiu, et al., "TRAM: A Tree-based Reliable Multicast Protocol", Sun Microsystems Laboratories, of Sun Microsystems, Inc., USA, Jul. 1998, 24 pgs.
Donahoo, Michael J. et al., "Scalable Multicast Representative Member Selection", 2001 IEEE, pp. 259-268.
Floyd, et al., "A Reliable Multicast Framework for Light-Weight Sessions and Application Level Framing", IEEWAU4 Transactions Networking, Date: Dec. 1997, vol. 5, No. 6, pp. 784-803.
Floyd, et al., A Reliable Multicast Framework for Light-Weight Sessions and Application Level Framing, Retrieved at << http://conferences.sigcomm.org/sigcomm/1995/papers/floyd.pdf>>, Nov. 1996, pp. 1-24.
Gemmell, et al., "Fcast Multicast File Distribution", Retrieved at <<http://reference.kfupm.edu.sa/content/f/c/fcast.sub.--multicast.-sub.--file.sub.--distribution.sub.--116541.pdf >>, IEEE Network, vol. 14, No. 1, Jan./Feb. 2000, pp. 58-68.
Gemmell, et al., "In Search of an API for Scalable Reliable Multicast", Technical Report, MSR-TR-97-17, Date: Jun. 23, 1997, 15 pgs.
Gemmell, et al., "The PGM Reliable Multicast Protocol", Retrieved at <<http://wmedia.grnet.gr/RMbackground/PGM.sub.--IEEE.sub.--Network- .pdf>>, IEEE Network, vol. 17, No. 1, Jan./Feb. 2003, 7 pgs.
Gemmell, Jim., "Scalable Reliable Multicast Using Erasure-Correcting Re-sends", Retrieved at <<http://reference.kfupm.edu.sa/content/s/c/scalable.sub.--reliable.sub.--m- ulticast.sub.--using.sub.--erasur.sub.--359684.pdf >>, Technical Report, MSR-TR-97-20, Jun. 30, 1997, pp. 1-15.
Ghosh, et al., "Congestion Control in Multicast Transport Protocols", Technical Report, WUCS-98-19, Jun. 1998, 22 pgs.
Golestani, et al., "Fundamental Observations on Multicast Congestion Control in the Internet",Retrieved at <<http://www.cs.ust.hk/faculty/bli/660h/golestani99fundamental.pdf >>, Proceedings IEEE Eighteenth Annual Joint Conference of the IEEE Computer and Communications Societies, Mar. 21-25, 1999, pp. 990-1000.
Hibler, et al., "Fast, Scalable Disk Imaging with Frisbee", Retrieved at <<http://www.usenix.org/events/usenix03/tech/full.sub.--papers/ful- I.sub.--papers/hibler/hibler.pdf >>, in Proceedings of the 2003 USENIX Annual Technical Conference, Jun. 2003, 15 pgs.
Holbrook, et al., "Log-based Receiver-Reliable Multicast for Distributed Interactive Simulation", Retrieved at << http://cs.ecs.baylor.edu/.about.donahoo/classes/5321/papers/HSC95.pdf >>, ACM SIGCOMM, Aug. 28-Sep. 1, 1995, pp. 328-341.
Jeacle, et al., "TCP-XM: Unicast-enabled Reliable Multicast", Retrieved at << http://www-test.cl.cam.ac.uk/research/srg/netos/papers/2005-jeac- le2005tcpxm.pdf>>, Proceedings 14th International Conference on Computer Communications and Networks, Oct. 17-19, 2005, 6. pgs.
Kermode, Roger George., "Smart Network Caches: Localized Content and Application Negotiated Recovery Mechanisms for Multicast Media Distribution", Retrieved at <<http://pubs.media.mit.edu/pubs/papers/kermode-phd.pdf >>, Jun. 1998, pp. 1-172.
Khanna, et al., "Failure Handling in a Reliable Multicast Protocol for Improving Buffer Utilization and Accommodating Heterogeneous Receivers", PRDC, 10th Pacific Rim International Symposium on Dependable Computing (PRDC'04), 2004, 20 pgs.
Liang, et al., "TCP-SMO: Extending TCP to Support Medium-Scale Multicast Applications", Retrieved at <<http://www-dsg.stanford.edu/sliang/tcpm.sub.--infocom.pdf>>, in IEEE Infocom, Jun. 2002, pp. 10.
Markopoulou, et al., "Hierarchical Reliable Multicast: performance analysis and placement of proxies", Retrieved at <<http://mmnetworks.stanford.edu/papers/markopoulou.sub.--ngc00.pdf>>, NGC, Networked Group Communication, Nov. 8-10, 2000, pp. 1-9.
Mathis, et al., "The Macroscopic Behavior of the {TCP} Congestion Avoidance Algorithm", Retrieved at << http://www.cs.tut.fi/.about.dunaytse/ns2/mathis-tcpmodel-ccr97.pdf >>, ACM SIGCOMM Computer Communication Review, vol. 27, No. 3, Jul. 1997, pp. 1-16.
McKinley, Philip K. et al., "H-RMC: A Hybrid Reliable Multicast Protocol for the Linux Kernel", Date: 1999, Article No. 8, ACM Press, New York, USA, 20 pgs.
Metzner, John J., "An Improved Broadcast Retransmission Protocol", Retrieved at <<http://ieeexplore.ieee.org/stamp/stamp.jsp?tp=&arnumber=1096119 >>, IEEE Transactions on Communications, vol. 32, No. 6, Jun. 1984, pp. 679-683.
Miller, C. Kenneth, "Reliable Multicast Protocol and Applications" Date: Sep. 1998, vol. 1, No. 2, The Internet Protocol Journal, San Jose, CA, 10 pgs.

(56) References Cited

OTHER PUBLICATIONS

Montgomery, Todd., "A Loss Tolerant Rate Controller for Reliable Multicast", Retrieved at <<http://www.cs.wvu.edu/.about.tmont/ltrc-doc.ps.gz >>, Technical Report, NASA- IVV-97-011, Aug. 22, 1997, 14 pgs.
Mysore, et al., "FTP-M: An FTP-like Multicast File Transfer Application", Retrieved at <<http://www.google.co.in/url?sa=t&source=web&cd=2&ved=0CB8QFjAB&url=http%3-A%2F%2Fcseweb.ucsd.edu%2Fusers%2Fvarghese%2FPAPERS%2Fmanaftp.ps&ei=680qTe7-fl826hAfH1ODaDg&usg=AFQjCNGTZIRNO9Qx4PqwpA2a0DPLCxpebQ >>, Technical Report, CS2001-0684, Sep. 11, 2001, 5 pgs.
Nonnenmacher, et al., "Parity-Based Loss Recovery for Reliable Multicast Transmission", Retrieved at <<http://www4.ncsu.edu/.about.rhee/export/papers/nonnenmacher97paritybased.- pdf >>, Technical Report 97-17, Mar. 1997, 13 pgs.
Nonnenmacher, et al., "Reliable multicast: Where to use FEC", Retrieved at <<http://www.eurecom.fr/.about.btroup/BPublished/FECgain.ps. gz>>, 1996, pp. 1-15.
Padhye, et al., "Modeling TCP Throughput: A Simple Model and its Empirical Validation", Retrieved at <<http://web.univ-pau.fr/.about.cpham/TCP/Padhye98.pdf>>, May 30, 1998, 11 pgs.
Paul, et al., "Reliable Multicast Transport Protocol (RMTP)", Retrieved at <<http://www.it.iitb.ac.inLabout.supriya/Seminar/pau197reliable.p- df>>, IEEE Journal on Selected Areas in Communications, vol. 15, No. 3, Apr. 1997, 15 pgs.
Radoslavov, et al., "A Comparison of Application-Level and Router-Assisted Hierarchical Schemes for Reliable Multicast", Retrieved at << http://128.9.176.20/divisions/div7/publication.sub.--files/comparison.sub-.--of.sub.--application.pdf>>, IEEE/ACM Transactions on Networking, vol. 12, No. 3, Jun. 2004, 14 pgs.
Rizzo, Luigi., "Effective Erasure Codes for Reliable Computer Communication Protocols", Retrieved at << http://www.cs.utexas.edu/users/lam/395t/2010%20papers/FEC-rizzo.pdf>>, ACM SIGCOMM Computer Communication Review, vol. 27, No. 2, Apr. 1997, pp. 24-36.
Rizzo, Luigi., "pgmcc: a {TCP}-Friendly Single-Rate Multicast congestion control scheme", Retrieved at << http://conferences.sigcomm.org/sigcomm/2000/conf/paper/sigcomm2000-1-2.pd-f>>, ACM SIGCOMM, Aug. 28-Sep. 1, 2000, pp. 17-28.
Shim, Hyong Sop et al., "Stateful Multicast Services for Supporting Collaborative Applications", CSE-TR-351-97, Department of EECS, University of Michigan, Nov. 1997, 13 pgs.
Shiroshita, Teruji et al., "Reliable Multicast Transport Protocol (RMTP)", Date: Feb. 7, 1997, Information and Communication Systems Laboratory, NIT, 7 pgs.
U.S. Appl. No. 11/823,143, Amendment and Response filed Oct. 21, 2010, 23 pgs.
U.S. Appl. No. 11/823,143, Amendment and Response filed Oct. 7, 2010, 12 pgs.
U.S. Appl. No. 11/823,143, Amendment and Response filed Feb. 11, 2010, 8 pgs.
U.S. Appl. No. 11/823,143, Amendment and Response filed Apr. 19, 2010, 8 pgs.
U.S. Appl. No. 11/823,143, Amendment and Response filed Apr. 6, 2011, 13 pgs.
U.S. Appl. No. 11/823,143, Notice of Allowance mailed Jun. 13, 2011, 7 pgs.
U.S. Appl. No. 11/823,143, Office Action mailed Jan. 7, 2011, 6 pgs.
U.S. Appl. No. 11/823,143, Office Action mailed Jul. 22, 2010, 7 pgs.
U.S. Appl. No. 11/823,143, Office Action mailed Aug. 11, 2009, 8 pgs.
U.S. Appl. No. 11/823,541, Amendment and Response filed Jan. 10, 2011, 27 pgs.
U.S. Appl. No. 11/823,541, Amendment and Response filed Jan. 4, 2012, 14 pgs.
U.S. Appl. No. 11/823,541, Amendment and Response filed Feb. 18, 2010, 14 pgs.
U.S. Appl. No. 11/823,541, Amendment and Response filed Jul. 9, 2012, 15 pgs.
U.S. Appl. No. 11/823,541, Office Action mailed Oct. 4, 2011, 23 pgs.
U.S. Appl. No. 11/823,541, Office Action mailed Mar. 7, 2012, 22 pgs.
U.S. Appl. No. 11/823,541, Office Action mailed Jul. 13, 2009, 17 pgs.
U.S. Appl. No. 11/823,541, Office Action mailed Sep. 9, 2010, 21 pgs.
U.S. Appl. No. 11/824,890, Amendment and Response filed Feb. 5, 2010, 13 pgs.
U.S. Appl. No. 11/824,890, Amendment and Response filed Aug. 20, 2010, 11 pgs.
U.S. Appl. No. 11/824,890, Notice of Allowance mailed Sep. 20, 2010, 8 pgs.
U.S. Appl. No. 11/824,890, Office Action mailed Jun. 1, 2010, 11 pgs.
U.S. Appl. No. 11/824,890, Office Action mailed Aug. 10, 2009, 12 pgs.
Visoottiviseth, et al., "M/TCP: The Multicast-extension to Transmission Control Protocol", Proceedings of ICACT, Feb. 2001, 6 pgs.
Widmer, et al., "TCP-Friendly Multicast Congestion Control (TFMCC): Protocol Specification", Retrieved at << http://tools.ietf.org/html/rfc4654 >>, Aug. 2006, 33 pgs.
Yavatkar, et al., "A Reliable Dissemination Protocol for Interactive Collaborative Applications", Retrieved at << http://reference.kfupm.edu.sa/content/r/e/a.sub.--reliable.sub.--dissemin- ation.sub.--protocol.sub.--for.sub.--in.sub.--224489.pdf >>, In Proceedings of the ACM Multimedia Conference, Nov. 1995, 19 pgs.
Zhang, et al., "Sender-Adaptive and Receiver-Driven Layered Multicast for Scalable Video Over the Internet", IEEE Transactions on Circuits and Systems for Video Technology, Date: Apr. 2005, vol. 15, No. 4, pp. 482-495.
U.S. Appl. No. 13/198,621, Office Action mailed May 16, 2013, 10 pgs.
U.S. Appl. No. 11/823,541, Office Action mailed Apr. 5, 2013, 22 pgs.
U.S. Appl. No. 11/823,541, Amendment and Response filed Jul. 3, 2013, 15 pgs.
U.S. Appl. No. 11/823,541, Notice of Allowance mailed Sep. 16, 2013, 13 pgs.
U.S. Appl. No. 13/198,621, Amendment and Response filed Aug. 16, 2013, 17 pgs.
U.S. Appl. No. 13/198,621, Office Action mailed Nov. 7, 2013, 16 pgs.
U.S. Appl. No. 11/823,541, Notice of Allowance mailed Nov. 18, 2013, 3 pgs.

\* cited by examiner

MULTICAST CONTENT PROVIDER

BACKGROUND

Multicast implementations in enterprise servers generally fall into two categories: unreliable and reliable. Unreliable implementations, as might be expected given the name, are used in applications where it is okay if content is missed by the receiver. An example of this is a broadcast of a company meeting. If a client device misses a packet, the video/audio may skip a little, but the server should not have to resend the packet—the client's receipt of the one missed packet is not critical. Reliable implementations, by contrast, are used in applications where it is mandatory that the client device receive the entire transmission. An example of this is distribution of a security hot fix or patch. If a client misses a portion of the transmission, the client may have received an incomplete hot fix and thus still be vulnerable to the security flaw. In multicast solutions in the market today, the multicast transmission protocol and the content delivered by it are explicitly tied. For example, in a multimedia multicast stream no data layer exists—the multicast protocol itself is implemented for the sole purpose of transmitting multimedia data and does not work for other content types that do not adhere to multimedia formatting.

SUMMARY

A multicast content provider operates on a multicast server in conjunction with a multicast transmission protocol that is independent of the content data transmitted and allows extensibility in the content provider to distribute any type of content. The content provider module may be designed to find, read, write, and transform particular types of data into a form acceptable for transmission by the transmission protocol on the multicast server. The transmission protocol is agnostic to the type, size, format, or location of the data file. The content provider module manages these issues so that the transmission protocol does not have to. This relationship between the content provider module and the transmission protocol establishes a "generic" multicast solution, capable of complete flexibility with regard to content delivery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

"Multicast" is a term used to describe the delivery of data to a group of destinations, usually from a server computer to multiple client computer devices, simultaneously. The goal of multicast is to use the most efficient strategy to deliver the messages over each link of the network only once, creating copies only when the links to the destinations split. The role of the content provider as disclosed herein is to provide a layer of abstraction as to the actual data that is being sent via multicast. In other words, the content provider knows what the actual data "looks like"—i.e., the format of the data, the storage location of the content—and simply passes blocks of data to the multicast server where the transmission protocol creates multicast packets and sends and receives the data over a network connection. The multicast transmission protocol decides how to most efficiently transfer the blocks of data; the protocol does not know the exact content or format of the data. This layer of abstraction provides an extensibility mechanism for delivering content via multicast because the content type and the data transfer are separate entities.

Figure 1:
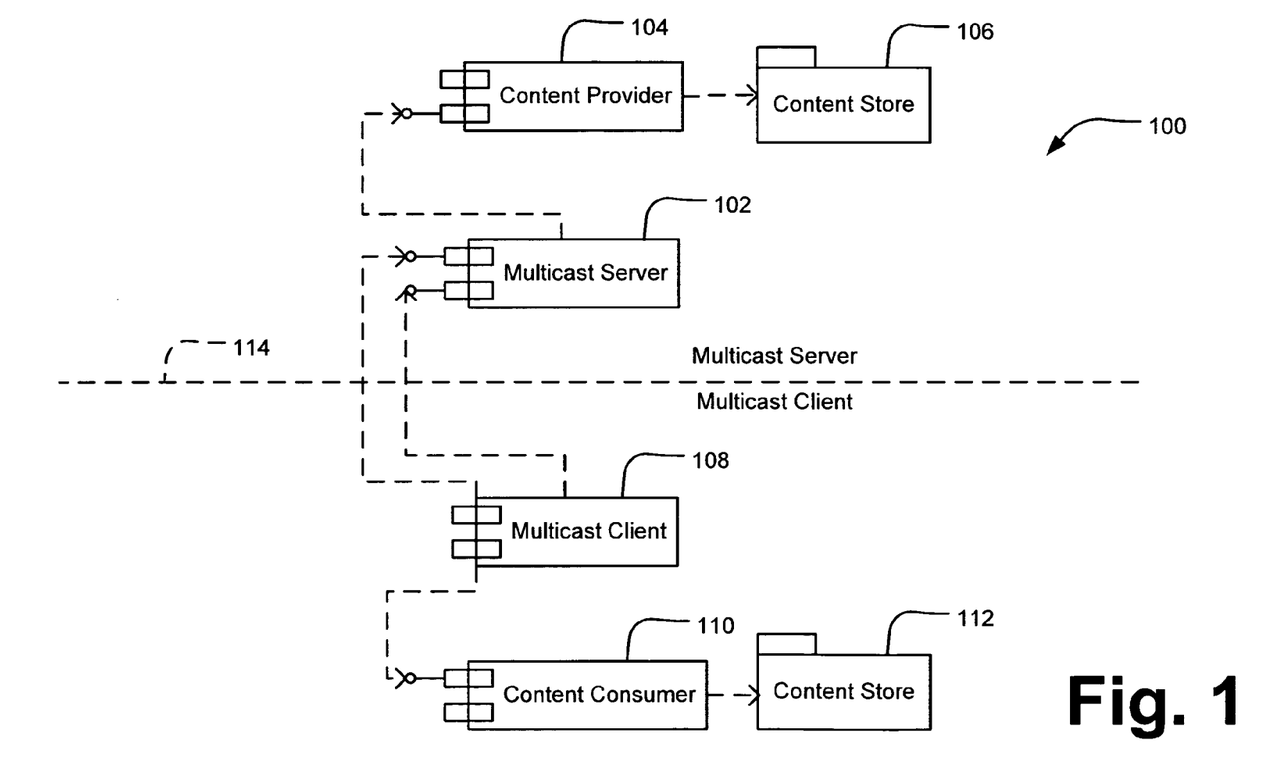
FIG. 1 is a schematic diagram of an implementation of a multicast computer system incorporating a content provider module model.

An exemplary implementation of a content provider model in a multicast distribution system 100 is depicted in FIG. 1. The multicast distribution system 100 is built around a multicast server 102 on which a content provider module 104 is installed. The multicast server 102 provides multicast data distribution over a network according to a transmission protocol application running on the multicast server 102. The transmission protocol handles the networking layer of multicast transmissions. Such functions may include registering for remote procedure call (RPC) and user datagram protocol (UDP) endpoints with the multicast network, accepting incoming RPC/UDP packets and forwarding them to the correct content provider, and generating and sending RPC/UDP response packets. RPC endpoints are used by multicast server management and by client devices in making session join requests. UDP endpoints are used to transmit data over a multicast channel.

The content provider module 104 may be another application running on the multicast server 102, e.g., as a plug-in application, and may communicate with the transmission protocol via an application protocol interface (API) designed specifically to support the content provider model. The content provider module 104 may be designed to find, read, write, and transform particular types of data into a form acceptable for transmission by the transmission protocol on the multicast server 102. The transmission protocol is agnostic to the type, size, format, or location of the data file; the purpose of the content provider 104 is to manage these issues so that the transmission protocol does not have to.

In addition to providing contents, the content provider module 104 may also authorize each client device requesting to join a session. This provides greater flexibility and control to the content provider module 104 with respect to who gets to join the session. The requests to join the session, e.g., in the form of a client access token, may be received by the multicast server 102 over RPC, which provides easy method for receiving client identity at the multicast server. The transmission protocol can be configured to apply a specific discretionary access control list to control access to the multicast session and it can also forward the client token to the content provider module 104. It is then the responsibility of the content provider module 104 to apply restrictions to content or denial of service based on the authentication data.

One or more client devices 108 may be connected with the multicast server 102 across a network link 114 in order to receive transmissions of data content. A content consumer module 110 corresponding to the content provider module 104 on the server-side may be installed on the client device 108 in order to handle the data content received by the client device 108 as part of a multicast transmission. The client device 108 may simply pass the data received via multicast to the content consumer module 110 that then writes the data to storage in an appropriate content store 112 either on or connected with the client device 108. The content consumer module 110 may be authored by the same entity as the content provider module 104, thus providing a package of content distribution plug-ins at each end of the multicast distribution system that are able to manage the storage and retrieval of the distributed content.

The transmission protocol of the multicast server 102 provides an extensible mechanism which may allow any third-party developer to deliver content using the transmission protocol. The third-party content provider can provide the contents by reading from a file, a database, a memory buffer, socket, or by any other means as long as it provides the data in a form that meets the requirements set by transmission protocol. Each content provider 104 may be registered with the multicast server 102 and may be used by the transmission protocol when a transmission session is requested for that content provider 104.

While content provider modules 104 are not concerned with how the data is delivered, the transmission protocol may impose one or more high-level requirements for contents provided by a content provider. One exemplary requirement may be that the content provider module 104 must be able to determine the size of the data file at the start of a transmission session. Another exemplary requirement may be that the content provider module 104 must guarantee that the content will remain same during the lifetime of the transmission session. A further exemplary requirement may be that the content provider module 104 must provide random or non-sequential access to data files. Yet another exemplary requirement may be that the content provider module 104 should be capable of supporting the provision of content for multiple open channels at the same time.

The content provider model may employ the use of a namespace construct. A namespace is a set of configuration parameters which define the behavior of a multicast transmission session. A namespace specifies a content provider module to use for the gathering of the data to be delivered to the client. When it comes time to actually transmit the contents, the namespace instantiates a transmission session. Each namespace can start any number of active transmission sessions. A session is established when a request is received from client. The behavior of the session is controlled by the attributes defined in namespace. An active session handles client requests received on a specific network interface and requesting the same contents. The session is kept alive as long as there is at least one client on the session.

Creation of a namespace may be performed by an administrator through a management object on the multicast server. The administrator creates a transmission session for content (e.g. an image) and client devices join that transmission session to receive the content. In one implementation, a management task registers a namespace by providing the following data: name of namespace (e.g. "ABC"); name of content provider (e.g. "ZIPFILE"); configuration parameters that define available content (e.g., a single file, content within the file, or a directory, e.g., "C:\ . . . \1.zip" or "C:\remoteInstall\Images\ImageGroup1"); a security descriptor for authorization of clients; and protocol-specific options (e.g., session start or join parameters (on-demand or one-time sessions); file size/block size; session lifetime).

Figure 2:
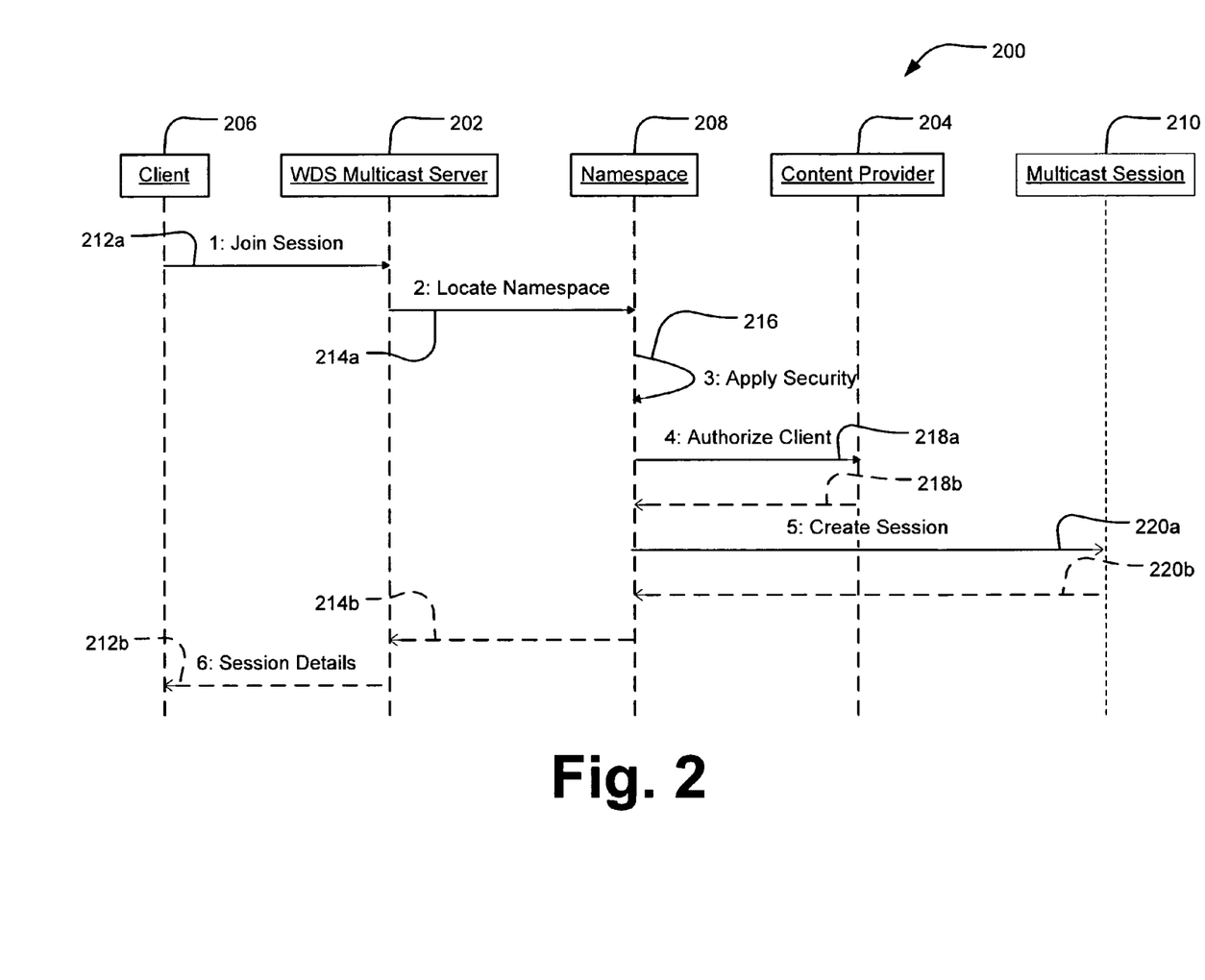
FIG. 2 is a sequence diagram depicting an implementation of the creation of a multicast session incorporating a content provider module model.

Once a namespace is registered, client devices may connect with the specific namespace to initiate or join a transmission session defined by the namespace and request contents. As depicted in the sequence diagram of FIG. 2, a client device 206 connects to a multicast session 210 on a multicast server 202 by sending a join request 212*a* to the server identifying a namespace 214*a*. Each client needs to "know" what namespace 208 to connect to. This is generally performed by building a client application corresponding to a content provider module and that knows the registered namespaces harnessing the content provider on the multicast server. When the namespace 208 is selected, it initially applies any known security policies 216. If a security descriptor is specified for a namespace 208, then authorization for the client device 206 will be sought in the join request. If the content provider 204 has registered to authorize the client device 206, a callback 218*a* will be issued to solicit authorization for the client device 206 from the content provider 204. The API for the content provider 204 may provide for basic access control based on user tokens. If the client device 206 is authorized 218*b*, a multicast session 210 is created 220*a* (or if a session already exists for the content provider 204, that existing session may be used) and session details 212*b* are sent to the client device 206 through a return path 220*b*, 214*b*, 212*b*. From this point forward all communication with client device 206 happens on multicast channel 210.

Multiple content providers and multiple namespaces may be active and registered at the same time. This allows for scenarios such as transmitting multimedia streaming audio/video to one group of client computers (e.g., handled by an audio/video content provider and a registered namespace referring to that content provider) and transmitting stock quotes (e.g., handled by a second content provider that knows how to provide that data and a registered namespace referring to that content provider) to a second group of client computers (or the same client computers listening on different multicast channels) simultaneously.

Namespaces for on-demand transmission sessions may be kept active until deleted by the administrator. The purpose is to define the configuration parameters once and use them over and over. As requests are received the predefined configuration parameters are used to define the behavior of the communication. Scheduled namespaces may also be created by an administrator to start a single multicast session. Generally, a specific time of day is set when a transmission session is automatically started. Alternatively, a session may be manually triggered by the administrator. Generally, once a scheduled session has started, no more clients can join the session.

Note that the transfer of content according to the parameters set in a namespace can span multiple network interfaces. At the multicast transmission protocol layer, each network interface has its own session and the multicast server simply aggregates the data to make the management concept simpler. Thus, if a multicast server has two network interface connections and client devices are connected on both interfaces, the content will be sent on the network twice—once from each interface. In the context of the multicast server there are two transmission sessions—one for each interface. From the standpoint of an administrator, there is a single session with aggregated data from both interfaces.

The multicast server may store content provider module configuration information on a per-session basis. This configuration information may be stored as a string. It is the responsibility of the implementer of the content provider to define the format of the configuration data stored in this string, if any. An instance represents the content provider module as configured per one configuration string. The content provider module may perform any initialization required in this function, and return a session that represents the instance. The content provider module may maintain this initialized state until the handle is closed.

One exemplary implementation for supporting multiple sessions across multiple network connections uses the concept of "streams." Implementers of content provider modules may expose any data desired as a stream. The transmission protocol may place certain requirements on a stream in order to ensure data integrity or to facilitate certain types of transmission sessions, for example, on-demand sessions as indicated above and described in greater detail below with respect to FIG. 4. Exemplary requirements may include that the length of the data represented by the stream is determinable at the initiation of the stream; that the data represented by the stream remain static for the lifetime of the handle; and that the view of the data supports random access.

Streams may be opened by names that are meaningful to the content provider. An instance may be provided in all sessions that deal with stream names. The content provider may use the state represented in the provided instance to open the appropriate stream. It may be possible for the multicast server to close a stream of a particular instance while there are still open streams corresponding to that instance. If multiple streams accessing the same data are opened by a content provider, each stream may be referred to as a stream "handle." Depending upon the requirements placed upon the stream, the view may be either sequentially or randomly accessible. After opening a stream handle, the multicast server may provide the content provider with a client token of the client device that wishes to receive the stream.

The data underlying the view of a stream handle does not necessarily have to remain static as long as the view itself remains static. If the underlying data changes, the multicast server may attempt to open a new handle to the stream. The view represented by this new handle may thus contain the most up-to-data version of the underlying data. Note that it is possible to have multiple different stream handles opened for the same stream name that expose different views.

The multicast server may also choose to open a new handle to a stream even when the contents of that stream remain the same. The content provider modules may treat the opening of such stream handles in the same manner as an opening of a stream handle to data that has changed rather than trying to consolidate these stream handles.

Figure 3:
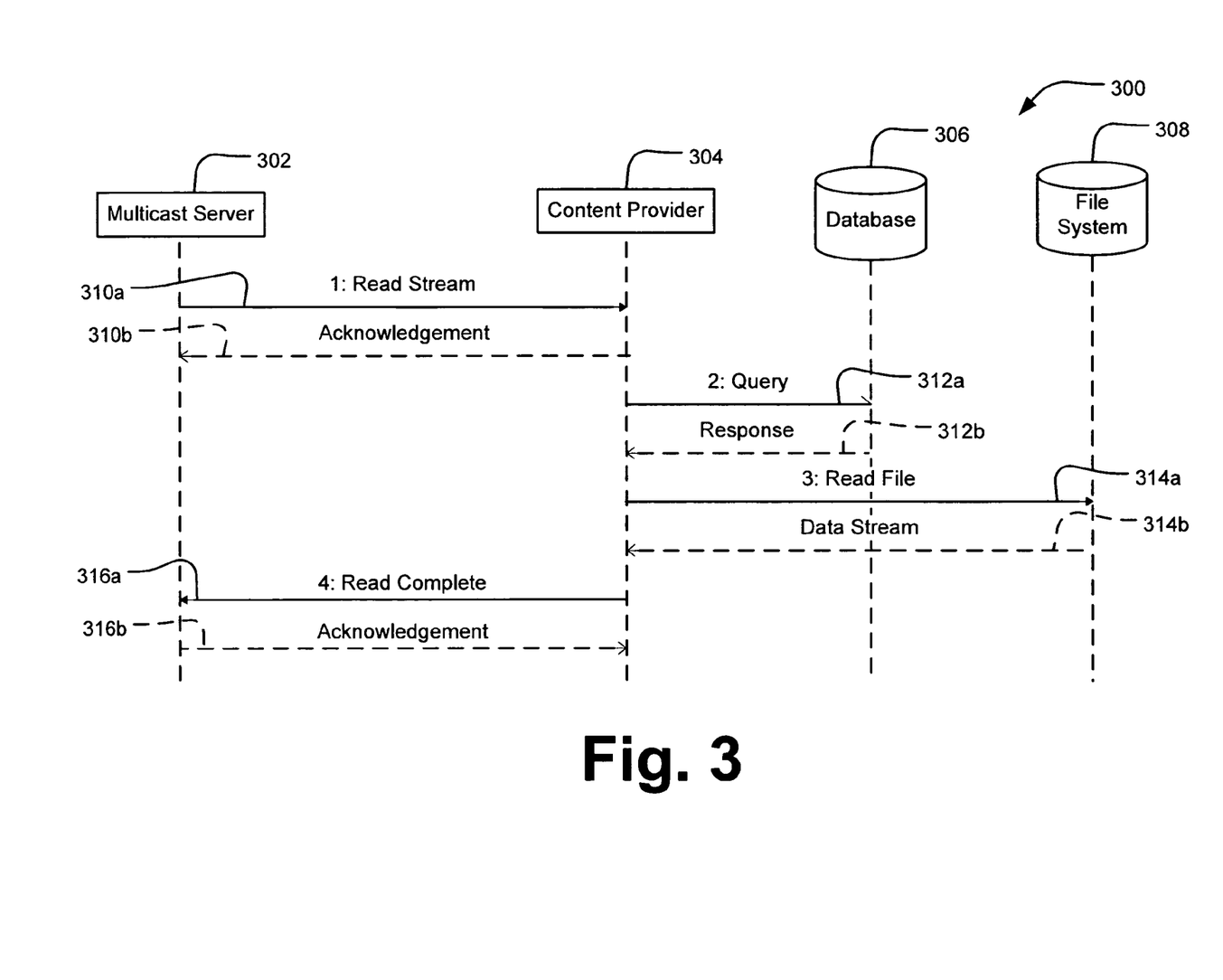
FIG. 3 is a sequence diagram depicting an implementation of stream generation by a content provider module for a transmission session.

FIG. 3 is a sequence diagram 300 depicting an implementation of how a content provider module 304 on a multicast server 302 may expose a hybrid database 306/file system 308 stream view. A request from a client device may be passed by the multicast server 302 to read a particular data stream 310a. The content provider module 304 may acknowledge the request 310b and then proceed to open a corresponding stream.

In this example, part of the content read may be satisfied through the database 306, and part of the content read may be satisfied through the file system 308. For example, the database 306 may be queried 312a by the content provider 304 to determine the location of a file in the file system 308 to stream. A look-up may then be performed in the database module 306 and a response 312b to the query 312a may be returned to the content provider module 304 which may be used to access the desired file from the file system 308. The content provider module may then send a read file request 314a to the file system 308 based upon the location information returned from the database 306. The file system 308 may then open a stream to the data content at the file location and return the data stream 314b to the content provider module 304. The content provider module 304 indicates to the multicast server 302 that the read is complete 316a and passes the data stream to the multicast server 302. To the multicast server 302, the stream view appears to be a single continuous block of data, receipt of which may be acknowledged 316b to the content provider module 304.

Figure 4:
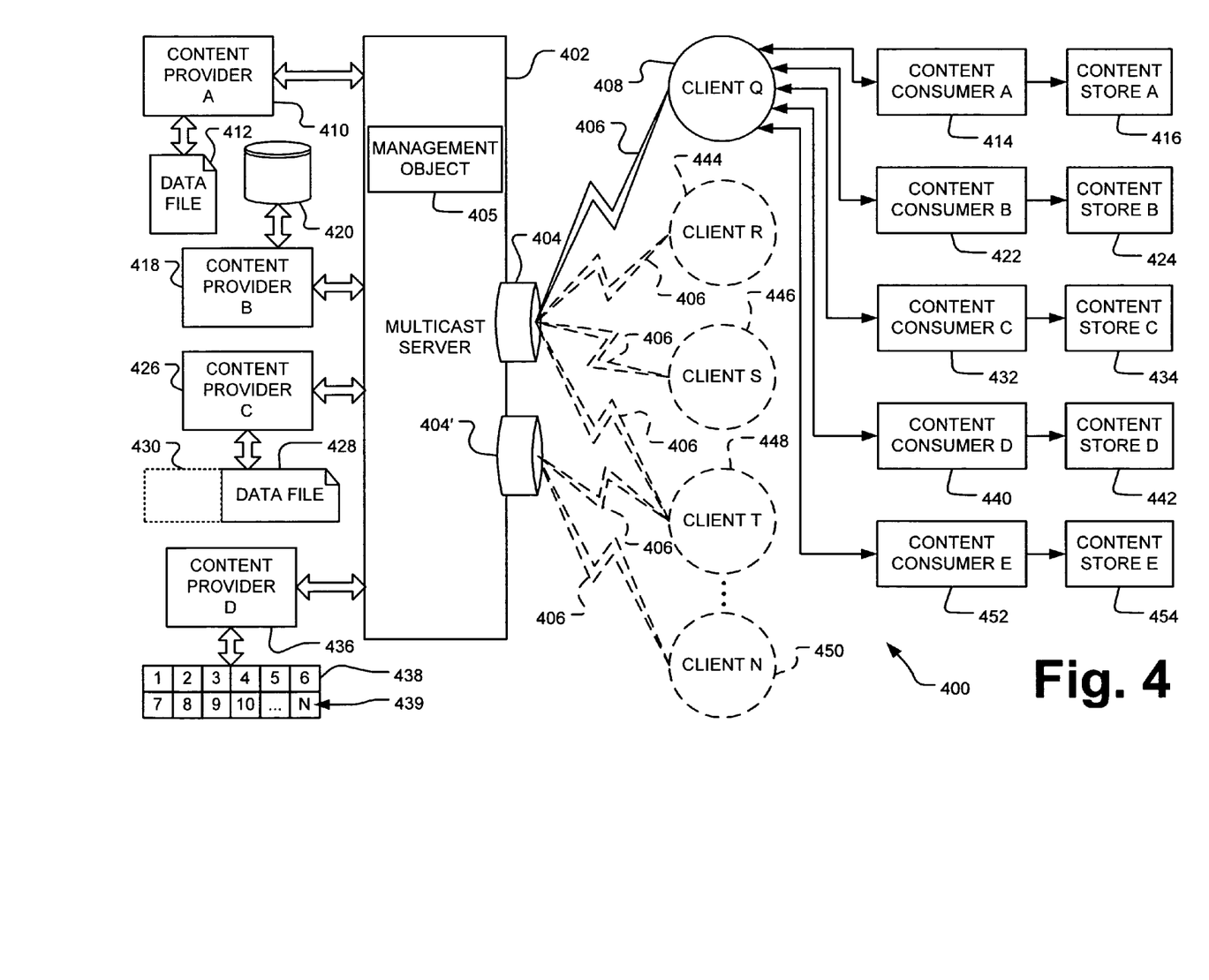
FIG. 4 is a schematic diagram depicting exemplary multicast transmission sessions by multiple content providers to multiple client devices.

An exemplary implementation of a content provider model for use with a multicast server protocol is depicted in FIG. 4. As is typical in a multicast distribution system, a multicast server 402 is connected via a network port 404 to one or more client devices over one or more network connections. The network connections can be part of a local area network, either wired (e.g., Ethernet) or wireless, or a wide area network, e.g., a public network such as the Internet. The multicast server 402 maybe embodied in a standard computer server device, a desktop computer, a notebook or portable computer, a tablet computer, a mainframe computer, or other devices with the ability to broadcast stored data to a plurality of devices connected over a network.

One or more content provider modules may reside upon or otherwise be connected with the multicast server 402. The content provider modules may be understood as plug-in applications to the operating system of the multicast server 402 to specifically manage data for multicast transmission. The content provider modules maybe authored by third-party developers to communicate with the multicast server 402 through an application protocol interface (API). The content provider modules package and deliver data to the multicast server 402 in blocks or packets appropriately sized and identified to be recognized by the transmission protocol of the multicast server 402.

A management object 405 may reside on the multicast server 402 to provide administrative functions over the data transmission sessions provided by the multicast server 402. For example, the management object 405, may allow an administrator to select data from a particular content provider for distribution and set any additional criteria for managing the distribution. Note that while the management object 404 is shown installed on the multicast server 402, the management object 404 maybe controlled remotely via a network connection with the multicast server 402. The transmission protocol of the multicast server 402 is independent of the data type of any of the blocks or packets provided by a content provider module. Any type of data appropriately packaged by a content provider module and passed to the multicast server 402 via the API can be transmitted to client devices by the multicast server 402 according to the transport protocol regardless of the type of data being transmitted.

As indicated in FIG. 4, a plurality of client devices, client device Q 408, client device R, 444, client device S 446, client device T 448, and client device N 450 may each be connected to the network port 404 at the multicast server 402 through network connections 406a, 406b, 406c, 406d, 406n, respectively. Each of the client devices 408, 444, 446, 448, 450 maybe any type of computer device capable of establishing a network connection 406a-n with the multicast server 402, for example, a personal computer, a notebook computer, another server, a table PC, a workstation, a mainframe computer, an internet appliance, a handheld PC, a mobile telephone or other wireless communication device, a personal digital assistant, a set-top box, a video gaming consul, or other similar computing devices. Within the following discussion, the actions of and with respect to the single client device Q 408 and the related network connection 406*a* should be understood as a representative of multiple client devices connected with a multicast server 402.

Once the data is received over the network 406 at a client device, one or more content consumer modules may receive the data from the client device and write the data to the content store. A content consumer module may be authored by the same party that authored a corresponding content provider module whereby the content consumer module understands the type of data received in the transmission and understands how to reassemble the data for writing to an associated content store.

Several examples of content provider modules and related content consumer modules are depicted in FIG. 4. Content provider module A 410 maybe understood as a module designed to package a generic data file 412 (e.g., an operating system update; audio files, video files) stored on a local file system. For example, the data file 412 maybe stored at a location identified by the path <c:/content provider/data file>. The content provider module A 410 may communicate with the transmission protocol on the multicast server 402 via an API 411. The content provider module A 410 understands how to package the particular data file 412 such that it can be passed to the transmission protocol on the multicast server 402 for transmission to the various client devices.

For example, if the data file 412 consisted of a MPEG video file, the content provider module A 410 may be designed to ensure that, when packaging data for transmission by the transport protocol of the multicast server 402, the data representing groups of pictures is maintained coherently for reassembly into a single data file at the client device. In this example, blocks of data from the data file 412 maybe transmitted by the multicast server 402 through the network port 404 across the network connection 406*a* to the client device Q 408.

As depicted in FIG. 4, the client device Q 408 may host one or more content consumer modules. As indicated, consumer modules for client devices maybe authored by the same authors as the content provider modules in order to accurately reassemble data received at the client device after transmission. Therefore, as shown in FIG. 4, a content consumer module A 414 may be connected with or loaded on the client device Q 408 and write the data transmitted to an associated content store A 416. Thus, the content provider module A 410 and the content consumer module A 414 coordinate the packaging and unpacking of the data file 412, which was transmitted by the multicast server 402 using a transmission protocol that is completely agnostic to the type of data being transmitted. In the example above of transmitting MPEG video, the consumer module A 414 may be specifically designed by the author to unpack MPEG video and write it to the content store A 416.

Content provider module B 418 is also shown in FIG. 4 as communicating with the multicast server 402 through an API 411. The content provider module B 418 may have been authored by an entirely different entity than the author of content provider module A 410 in order to package a different type of data for transmission via the multicast server 402. In this example, the content provider module B 418 is a module designed to extract and package data directly from a connected database 420 for transmission via the agnostic transmission protocol of the multicast server 402. As further shown, once the blocks or packets of database content 420 are received at the client device Q 408, a corresponding content consumer module B 422, which may be authored by the same author as the content provider module B 418, may receive the data from client device Q 408 and rewrite the data in an appropriate form to the content store B 424.

A further content provider module C 426 may be provided on the multicast server 402 to transmit yet another type of data content represented by data file 428. Again, the content provider module C 426 communicates with the transmission protocol and the multicast server 402 via a standard API 411. As indicated in FIG. 4 the content provider module C 426 manages the packaging for transmission of a data file 428, which may be subject to regular updates as indicated by the new or updated data portion 430. As previously discussed, one of the requirements of the transport protocol and one of the guarantees that may be made by a content provider is that the content must be fixed during any particular transmission session. Thus, part of the functionality of the content provider module C 426 may be to ensure that any updated data 430 remains separate from the original portion of the data file 428 for the duration of the transmission session. Again, upon receipt at the client-side by client device Q 408, an associated content consumer module C 432 maybe handed the blocks of data from the data file 428 from client Q 408 and then written to the associated content store C 434.

Another form of a content provider that is designed to package data for a continuous, on-demand multicast session is represented by the content provider module D 436. Again, the content provider module D 436 communicates with the transmission protocol of the multicast server 402 via the API 411. Typically in an on-demand multicast scenario, minimal if any distribution criteria will be put in place as a transmission session should be initiated upon any request of a client device at any time and continue until the client requests are completed. However, it may be desirable in some circumstances, for example, to preserve network bandwidth during high-traffic periods, e.g., during the work day, to limit the timeframe available for on-demand multicast sessions, e.g., to occur overnight only.

The content provider module D 436 maybe used in conjunction with the multicast server 402 to directly manage the selection and transfer of a data file 438 for on-demand transmission by the multicast server 402. The content provider module D 436 may manage a content store for the data file 438 that is separate from, but connected with the multicast server 402. As shown in FIG. 4, the data 438 maybe divided into numbered subsets or data blocks 439. The data blocks 439 may be discrete data packets or groups of data packets. The division of the data file 438 into data blocks 439 assists in the ability of the multicast server 402 to provide an on-demand multicast transmission session. In order to conduct an on-demand transmission session, the content provider module D 436 may be required to provide non-sequential selection of data blocks 439 from the data file 438 for transfer via the on-demand transmission protocol of the multicast server 402. As will be described in greater detail below, client devices requesting the data file 438 in a particular on-demand transmission session are advised of the number of the data blocks 439 in the transmission session and are charged with the responsibility of monitoring which of the data blocks 439 have already been received and which of the data blocks 439 still need to be received.

In an on-demand multicast implementation, each of the client devices 408, 444, 446, 448, 450 establishes a network connection 406*a-n* with the multicast server 402 through the network port 404 at any time to join a transmission session. The first client device that submits a request will immediately initiate a transmission session of the data file 438. Any subsequent client device making a transmission request will simply join the transmission session already in progress. As part of the join processes, the management object 405 may provide authorization to client devices 408, 444, 446, 448, 450 to join a transmission session and may further indicate to a requesting client device the number of data blocks 439 in the data file 438 being transmitted in the particular transmission session. Knowledge of the number of data blocks 439 in a data file 438 allows a client device 408, 444, 446, 448, 450 to determine when it received the entire data file 438 and can exit the transmission session.

For example, presume that client device Q 408 is the first to make a request to the management object 405 for the data file 438. The administrator has configured the particular data file 438 for on-demand multicast transmission and the management object 405 replies to the request of client device Q 408 with an authorization number N of data blocks 439 in the data set 438 to be transmitted. The client device Q 408 then sends authorization over the network 406a to the multicast server 402, which then requests approval of the authorization from the content provider module D 436. Upon confirmation of the authorization, the multicast server 402 then queries the client device Q 408 for the number of the N data block 439 requested. If this is the initial transmission session, the client device Q 408 will request all N data blocks 439. The multicast server 402 requests the data blocks 439 1-N from the content provider module 436 and begins the transmission session with the first data block 439 of data file 438.

Next, presume that at some later time client device R 414b sends a request over the network 406b to the management object 405 on the multicast server 402 for transmission of the data set 408. Instead of denying client device R 444 access to the transmission session for failure to make a request before the initiation of the transmission session, the management object 405, provides authorization for the client device R 444 to join the transmission session and further provides the number N of data blocks 439 in the data file 438. The client device R 444 then sends its authorization over the network 406b and joins the transmission session already in progress. Presume that at the time the client device R 444 joins the transmission session the multicast server 402 is about to transmit the fourth of the data blocks 439. The client device R 444 will then receive the fourth of the data blocks 439 and additional ones of the data blocks 439 transmitted thereafter.

Note, however, that the transfer of the data blocks 439 is usually not sequential. The protocol of the multicast server 402 polls the client devices 408, 444, 446, 448, 450 to determine which of the data blocks 439 are still needed. At the beginning of a transmission session, any client device 408, 444, 446, 448, 450 joined at the time will likely request all N data blocks 439 in the data set 438. Thus, an initial transmission of the data blocks 439 may be sequential. However, it need not be; the initiating client device Q 408 may request less than the total number of data blocks 439 in the data file 438 (e.g., the client device was disconnected from the network during a previous session and did not receive all of the data blocks). Again, once the data blocks 439 of the data file 438 are received at the client device Q 408, they may be passed to a specific content consumer module D 440 that understands how to deal with on-demand multicast data and arranges and writes the blocks of data in an appropriate order and content store D 442. A content consumer module D (not shown) may similarly be installed on the client device R 444 that is configured to accept non-sequential data blocks 430 and write the data to an associated content store for that particular client device.

Once the initial set of in data blocks 439 has been transmitted, the requests for data blocks 439 from client devices 408, 444, 446, 448, 450 will likely be different depending upon the time the client device joined the transmission session and each request will likely be for some number of data blocks 439 less than N. For example, consider a scenario with respect to FIG. 4 in which client device S 446 joins the transmission session previously described, but does not join until the transmission of the ninth of the data blocks 439. Also assume that the client device Q 408 experienced interference on the network connection 406a while receiving the data blocks 439 and therefore has requested receipt of data block 2 again in response to the poll from the multicast server 402. In this scenario, all three joined client devices need data block 2, two client devices (client device R 444 and client device S 446) need data blocks 1 and 3, one client device (client device S 414c) additionally needs the data blocks 4-8, and none of the client devices 408, 444, 446 need transmission of the data blocks 9-12. Thus, it would be a waste of processing resources and network bandwidth for the multicast server 402 to transmit data blocks 9-12 again.

The logic of the on-demand multicast protocol may employ a sorting or weighting scheme to determine a prioritization order for transmitting additional data blocks 439 in further transmission cycles. Such schemes may be employed to meet certain transmission guidelines or goals, e.g., maximization of bandwidth efficiency or compliance with a requirement set by an administrator. For example, priority may be placed upon transmission of data requested by the most number of client devices before sending data requested by a lesser number of client devices. In this example in the context of the scenario described above, data block 2 may be transmitted first after which client device Q 408 may exit the transmission session. Next, data block 1 followed by data block 3 may be transmitted, as two client devices still need this information. After receipt of data blocks 1 and 3, the client device R 444 may exit the transmission session. Finally, data blocks 4-8 may be transmitted for the benefit of client device S 446, upon receipt of which client device S 446 may exit the transmission session.

The multicast server 402 may then poll for additional requests for data blocks 439. If no further requests are received from any of the client devices 408, 444, 446, 448, 450, then the on-demand multicast session on the multicast server 402 will remain dormant until a new request is received. As should be apparent from the above discussion, an on-demand multicast session could continue indefinitely as new client devices join the transmission session once it is initiated. Further, depending upon the sorting or weighting scheme employed by the multicast server 402 to select packets for on-demand delivery, once the initial series of data blocks 439 are sent, additional requested data blocks maybe sent in any order. If a client device 408, 444, 446, 448, 450 has already received a packet or data block transmitted, the client device may remain joined in the transmission session until the last needed packet is received.

Note, that when configuring a transmission session, the particular pairing of content provider module and corresponding content consumer module from a single vendor is not required. For example, consider an implementation wherein content provider module A 410 packages a data file that is originally stored in a zip format. Instead of selecting the corresponding content consumer module A 414 to write the reassembled .zip file to the content store A 416, the administrator may select an alternative content consumer module. In an exemplary implementation, the administrator may select the content consumer module E 452 that understands how to unpack .zip files and store the original uncompressed files directly to an associated content store E 454. Thus, because the data packaging and unpacking modules are independent of the transmission protocol, an administrator of a multicast server 402 is provided great flexibility in the types of data that can be distributed.

Note additionally, that multiple transmission sessions maybe implemented by the multicast server 402 simultaneously. Each of the content providers may operate independently upon receipt of a request for a transmission session from a client device to initiate a new transmission session. The multicast server may simply open a new network port 404' to support the transmission session for a requesting client device, e.g., client device N 450 as shown in FIG. 4. This simplifies the operations of the transmission protocol as there is not a need to arbitrate between multiple transmission sessions connected through the same network port. Further note that client devices may be connected with more than one transmission session at a time. For example, as depicted in FIG. 4, the client device T 448 is connected with a transmission session already in progress on network port 404, and further joins a second transmission session for a separate data file on the new port 404'.

Figure 5:
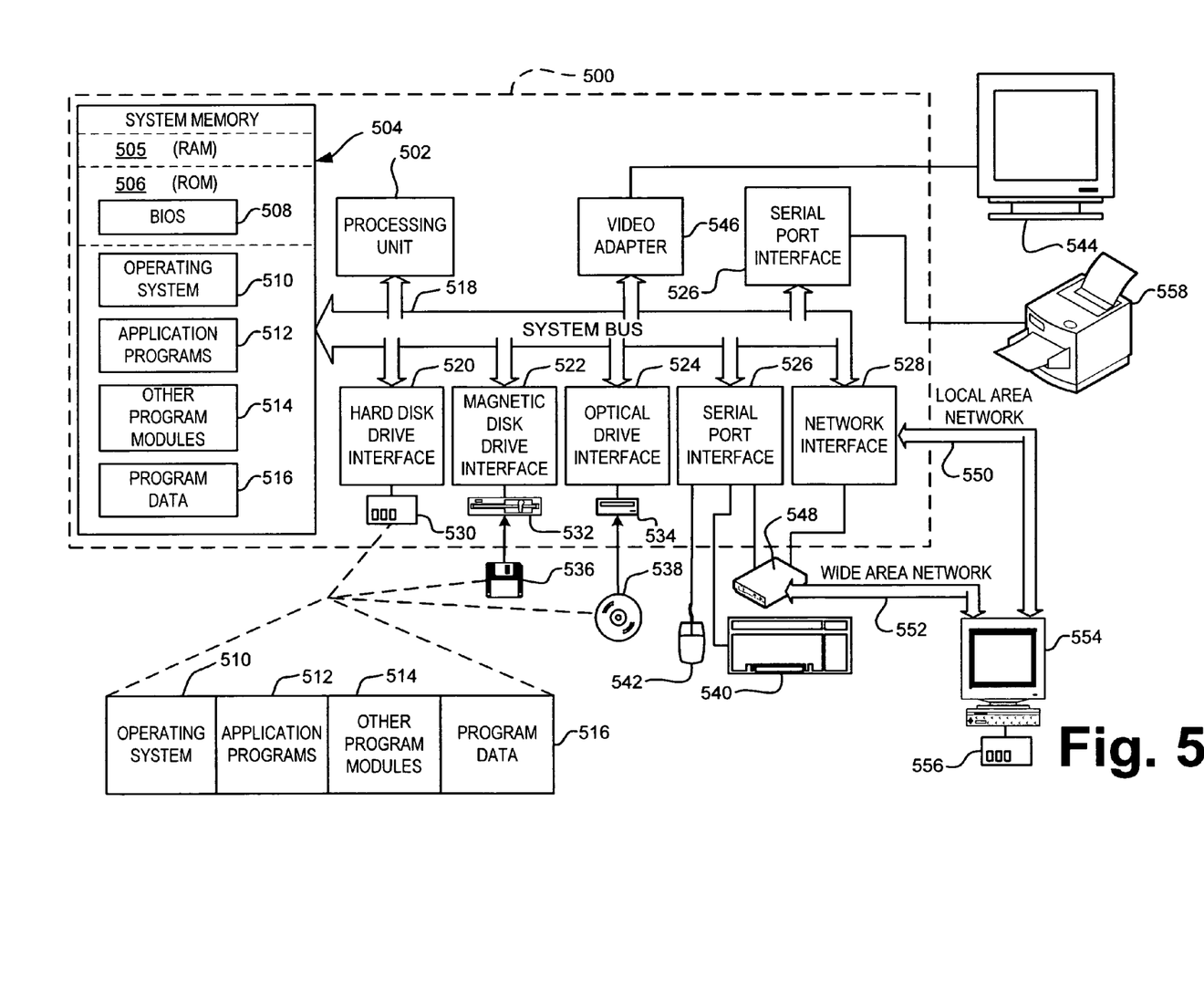
FIG. 5 is a schematic diagram of a general purpose computing device that may be implemented as a multicast server with a content provider or a client device.

An exemplary general purpose computing device that may be in the form of the multicast server or a client device is depicted in FIG. 5. The general purpose computer 500 includes a processing unit 502, a system memory 504, and a system bus 518 that operatively couples various system components, including the system memory 504 to the processing unit 502. There may be only one or there may be more than one processing unit 502, such that the processor of computer 500 comprises a single central processing unit (CPU), or a plurality of processing units, commonly referred to as a parallel processing environment. The computer 500 may be a conventional computer, a distributed computer, or any other type of computer; the invention is not so limited.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory, and includes read only memory (ROM) 506 and random access memory (RAM) 505. A basic input/output system (BIOS) 508, containing the basic routines that help to transfer information between elements within the computer 500, such as during start-up, is stored in ROM 506. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, other program modules 514, and program data 516. In an exemplary implementation, the transmission protocol may be incorporated as part of the operating system 510, or operated as a separate application program 512. Similarly, the content provider module at the multicast server and the content consumer module on the client device may be separate application programs 512 running on the respective computers or they may be other program modules 514, e.g., plug-ins to an application program 512 or the operating system 510.

A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB).

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a local-area network (LAN) 550 and a wide-area network (WAN) 552. Such networking environments are commonplace in office networks, enterprise-wide computer networks, intranets and the Internet, which are all types of networks.

When used in a LAN 550 environment, the computer 500 may be connected to the local network 550 through a network interface or adapter 528, e.g., Ethernet or other communications interfaces. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method on a computer server for multicasting data to a number of client devices comprising:
    exposing the data from a storage location through an application outside of control of a multicast transmission protocol operating on the computer server;
    creating a data stream of the data from the storage location in a format acceptable for transmission according to the multicast transmission protocol, further comprising dividing the data into a number of data blocks for transmission; and
    transmitting a first portion of the data blocks to a first client device upon initiation of a transmission session according to the multicast transmission protocol;
    receiving an indication that a second client device has joined the transmission session; and
    if the first portion of data blocks has already been transmitted, transmitting a second portion of the data blocks to both the first client device and the second client device, further including transmitting to the second client device information regarding a total number of data blocks in the transmission, the multicast transmission protocol being agnostic to data type and the multicast transmission protocol polling at least one of the first client device and the second client device to determine a block of the data not yet received by at least one of the first client device and the second client device.

2. The method of claim 1, further comprising:
    ensuring that an original form of the data is maintained for access until conclusion of the transmission session when the data is updated at the storage location during the transmission session.

3. The method of claim 1, further comprising:
    receiving a new request for the data from one of the client devices; and
    initiating a new transmission session to expose the updated data from the storage location when the data is updated during the transmission session.

4. The method of claim 1, further comprising:
    applying a security policy for the transmission session by authorizing the client devices to join the transmission session through the application outside of control of the multicast transmission protocol.

5. The method of claims 1, wherein the transmitting operation transmits the blocks of the data in a non sequential order.

6. The method of claim 1, further comprising:
    accessing the data from multiple storage locations in order to create the data stream.

7. The method of claim 1, further comprising:
    receiving a new request for a second set of data from the first and second client devices concurrent with the transmission session;
    exposing the second set of data from a second storage location through a second application outside of control of a multicast transmission protocol operating on the computer server;
    creating a second data stream of the second set of data from the second storage location in a format acceptable for transmission according to the multicast transmission protocol; and
    transmitting the second set of data to the first and second client devices during a second transmission session according to the multicast transmission protocol, where in the multicast transmission protocol is agnostic to data type.

8. The method of claim 1, further comprising:
    creating a separate network connection for transmission of the second set of data; and
    authorizing client devices joined to the transmission session to join the second transmission session, wherein the authorization operation is performed through the second application outside of control of the multicast transmission protocol.

9. A server device for multicasting data to a number of client devices comprising:
    a multicast server module that transmits data to one or more of the client devices during a transmission session according to a transmission protocol that is agnostic to data type, the multicast server module determining a portion of a data set a first client device is missing and a portion of the data set a second client device is missing by polling the first client device and the second client device, the data set being multicast by the server computer in a multicasting session, the first client device and the second client device having joined the multicast session in progress at different times, the multicast server sending respective missing data portions to the first client device and the second client device; and
    a content provider module that exposes the data from a storage location and provides the data to the server module in a format acceptable for transmission according to the transmission protocol.

10. The server computer of claim 9, wherein when the data is divisible into a plurality of blocks, the content provider module further provides non sequential access to the blocks of the data.

11. The server computer of claim 9, wherein when the data is updated during the transmission session, the content provider module further ensures that an original form of the data is maintained for access until conclusion of the transmission session.

12. The server computer of claim 9, wherein when the data is updated during the transmission session and upon receipt of a new request for the data from one of the client devices, the content provider module further initiates a new transmission session to expose the updated data from the storage location.

13. The server computer of claim 9, wherein the content provider module further applies a security policy for the transmission session by authorizing the client devices to join the transmission session.

14. The server computer of claim 9, further comprising;
a second content provider module that exposes a second set of data from a second storage location and provides the second data to the multicast server module in a format acceptable for transmission according to the transmission protocol.

15. A computer-readable storage device having computer-executable instructions for performing steps of a method for multicasting data to a number of client devices, the method comprising:
exposing the data from a storage location through an application outside of control of a multicast transmission protocol operating on a computer server;
creating a data stream of the data from the storage location in a format acceptable for transmission according to the multicast transmission protocol, further comprising dividing the data into a number of data blocks for transmission; and
transmitting a first portion of the data blocks to a first of client device upon initiation of a transmission session according to the multicast transmission protocol;
receiving an indication that a second client device has joined the transmission session; and
if the first portion of data blocks has already been transmitted, transmitting a second portion of the data blocks to both the first client device and the second client device, further including transmitting to the second client device information regarding a total number of data blocks in the transmission, the multicast transmission protocol being agnostic to data type and the multicast transmission protocol polling at least one of the first client device and the second client device to determine a block of the data not yet received by at least one of the first client device and the second client device.

16. The computer-readable storage device of claim 15, further comprising:
ensuring that an original form of the data is maintained for access until conclusion of the transmission session when the data is updated at the storage location during the transmission session.

17. The computer-readable storage device of claim 15, further comprising:
applying a security policy for the transmission session by authorizing the client devices to join the transmission session through the application outside of control of the multicast transmission protocol.

18. The computer-readable storage device of claim 15, further comprising:
accessing the data from multiple storage locations in order to create the data stream.

19. The computer-readable storage device of claim 15, further comprising:
using a sorting scheme to determine a prioritization order for transmitting additional data blocks in subsequent transmissions to the first client device and the second client device within the transmission session.

20. The computer-readable storage device of claim 15, further comprising:
receiving an indication that at least one of the first client device and the second client device has exited the transmission session.

* * * * *